United States Patent [19]

Inoue

[11] Patent Number: 5,358,589
[45] Date of Patent: Oct. 25, 1994

[54] LINING OF ORGANISM DEPOSIT-INHIBITING STRUCTURE

[75] Inventor: Shunji Inoue, Nagoya, Japan

[73] Assignee: NGK Insulators, Ltd., Japan

[21] Appl. No.: 27,758

[22] Filed: Mar. 8, 1993

[30] Foreign Application Priority Data

Apr. 2, 1992 [JP] Japan .................................. 4-81050
Apr. 2, 1992 [JP] Japan .................................. 4-81051

[51] Int. Cl.$^5$ .............................................. B29C 63/36
[52] U.S. Cl. .................................... 156/294; 114/222; 156/71; 428/907
[58] Field of Search .................... 156/71, 287, 294; 428/907; 422/6, 8; 114/222; 148/411

[56] References Cited

U.S. PATENT DOCUMENTS

| | | | |
|---|---|---|---|
| 2,139,497 | 12/1938 | Hansel et al. ........................... | 75/160 |
| 2,422,477 | 6/1947 | Driver ..................................... | 201/64 |
| 3,103,103 | 9/1963 | Liddell .................................... | 61/54 |
| 3,132,062 | 5/1964 | Lang et al. ............................. | 156/294 |
| 3,761,334 | 9/1973 | Zondek ................................... | 428/907 |
| 3,971,084 | 7/1976 | Spier . | |
| 4,202,858 | 5/1980 | Bruce et al. ............................ | 422/6 |
| 4,334,345 | 6/1982 | Jenks ...................................... | 29/523 |
| 4,375,199 | 3/1983 | Graeme-Barber et al. ........... | 114/222 |
| 4,551,187 | 11/1985 | Church et al. ......................... | 148/411 |
| 4,865,127 | 9/1989 | Koster .................................... | 166/277 |
| 4,865,673 | 9/1989 | Shishkin et al. ....................... | 156/294 |

FOREIGN PATENT DOCUMENTS

| | | | |
|---|---|---|---|
| 182897 | 8/1991 | Japan ..................................... | 114/222 |
| 2200712 | 8/1988 | United Kingdom ................. | 156/294 |

OTHER PUBLICATIONS

Richards, "Materials & Methods Manual 58: Beryllium Copper" pp. 76-90, Apr. 1950.
Patent Abstracts of Japan, vol. 10, No. 71, Apr. 3, 1984 & JP-A-60,209,505 (Nichiban KK. et al.).
Database WPIL, Section Ch, Week 8202, Derwent Publications Ltd., London, GB; Class M26, AN 82-02837 & JP-A-56,150,151 (Mitsubishi Heavy Ind. KK.).
Patent Abstracts of Japan, vol. 10, No. 390, Feb. 1, 1985 & JP-A-61,179,244 (Takiron Co. Ltd.).

*Primary Examiner*—Michael W. Ball
*Assistant Examiner*—Steven D. Maki
*Attorney, Agent, or Firm*—Parkhurst, Wendel & Rossi

[57] ABSTRACT

The invention provides a method for the lining of an organism deposit-inhibition structure, which enables that structure to be easily lined to an application surface, has superior characteristics to inhibit deposition of organisms and durability, dispenses with maintenance work, and offers no toxicity problems. A resin layer made up of an electrical insulating material is bonded to the inner wall periphery of a cylindrical pipe member. A metal gauze of a copper alloy is applied onto the surface of the resin layer. The metal gauze is either unfolded and drawn out or rolled over with the inner side turned outwards for its application to the surface of the resin layer. The copper alloy has a Be content of 0.2 to 2.8% by weight, and is selected from, e.g., Be—Cu, Be—Co—Cu, Be—Co—Si—Cu and Be—Ni—Cu alloys.

10 Claims, 4 Drawing Sheets

LINING OF ORGANISM DEPOSIT-INHIBITING STRUCTURE

BACKGROUND OF THE INVENTION

The present invention relates to the lining of a structure to an application surface, the structure being adapted to inhibit deposition of marine organisms such as barnacles, blue mussels, and seaweed- hereinafter called the organism deposit-inhibition structure.

Offshore or marine structures in contact with seawater are always exposed to contamination by marine organisms, resulting in appearance damage or malfunction. For instance, ships suffer a driving force drop when many forms of oceanic organisms are deposited onto their bottoms, etc. Thermoelectric power plants are forced to stop operation when various forms of oceanic organisms are built up on their seawater intake pits, because a serious problem arises in connection with the circulation of a seawater serving as a cooling medium.

Among scores of techniques for inhibiting marine deposits studied so far in the art, there is typically now available a method for protecting an offshore structure against contamination, in which the surface of that structure in contact with seawater is coated with a coating material containing cuprous oxide or organotin.

Another method is disclosed in JP-A-60-209505 that is directed to an adhesive member for inhibiting marine deposits, which comprises a sheet of copper or a copper alloy, a primer layer provided on one surface thereof, and an adhesive material layer formed on the primer layer.

A grave problem with the method using a coating material, however, is that the coating material has a service life of as short as one year, since even when applied in a thick layer, it is likely to peel away. Accordingly troublesome maintenance work in which the coating material must be renewed every year is required.

The marine organism deposit-inhibiting member disclosed in JP-A-60-209505, on the other hand, is found to be less than satisfactory in terms of corrosion resistance and antifouling effect, because of the use of a copper-nickel (Cu-Ni) alloy.

Our years of study have now revealed that the application of a beryllium-copper alloy to an offshore structure achieves a superior antifouling effect. It has been discovered that beryllium and copper ions interact synergistically, producing a great effect on inhibiting oceanic organisms from having access to the offshore structure and preventing their propagation. In other words, we have now found that the beryllium-copper alloy has a combined effect both on inhibiting marine deposits and on the continued liberation of copper ions.

A main object of the invention is to provide a method for the lining of an organism deposit-inhibition structure, which enables that structure to be easily lined to an application surface, has superior characteristics to inhibit deposition of organisms and durability, dispenses with maintenance work, and offers no toxicity problems.

SUMMARY OF THE INVENTION

According to the invention, the object mentioned above is achieved by provision of a method for the lining of an organism deposit-inhibition structure to an application surface, which involves forming an insulator layer on the inner wall surface of a metal pipe member, and bonding a metal gauze made up of a copper alloy to the surface of the insulator layer by drawing out or rolling over the metal gauze.

Preferably, the copper alloy has a Be content of 0.2 to 2.8% by weight, and is an alloy selected from the group consisting of Be—Cu, Be—Co—Cu, Be—Co—Si—Cu and Be—Ni—Cu alloys.

The present invention also provides a method for the lining of an organism deposit-inhibition structure to an application surface, which involves forming an insulator layer on the inner wall surface of a metal pipe member by a roll-over technique, and a copper alloy layer on the surface of the insulator layer.

Preferably, the copper alloy has a Be content of 0.2 to 2.8% by weight, and is an alloy selected from the group consisting of Be—Cu, Be—Co—Cu, Be—Co—Si—Cu and Be—Ni—Cu alloys.

BRIEF DESCRIPTION OF THE DRAWINGS

The invention will now be explained, more specifically but not exclusively, with reference to the accompanying drawings, in which.

DESCRIPTION OF THE PREFERRED EMBODIMENTS

Figure 1:
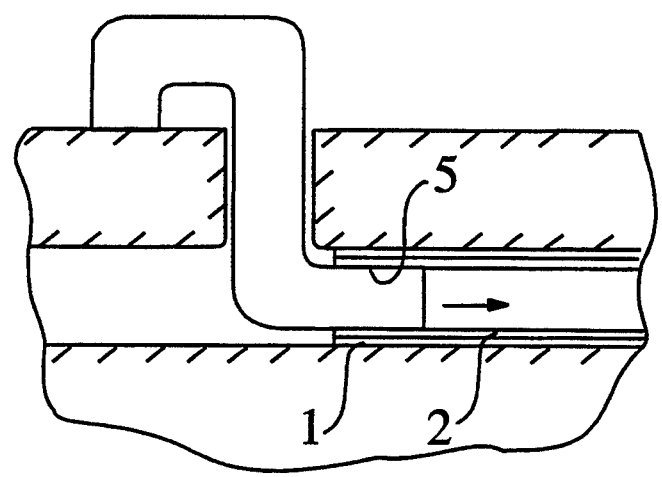
FIG. 1 is a schematic view of the first embodiment of the lining method according to the invention.

The copper alloy used in the invention has a beryllium content ranging from 0.2% by weight to 2.8% by weight, and may be selected from the group consisting of Be—Cu, Be—Co—Cu, Be—Co—Si—Cu and Be—Ni—Cu alloys.

Typical compositions of the copper alloy used in the invention are:

(1) 0.2 to 1.0% by weight of beryllium, 2.4 to 2.7% by weight of cobalt and the balance being copper and inevitable impurities, (2) 0.2 to 1.0% by weight of beryllium, 1.4 to 2.2% by weight of nickel and the balance being copper and inevitable impurities, (3) 1.0 to 2.0% by weight of beryllium, 0.2 to 0.6% by weight of cobalt and the balance being copper and inevitable impurities, and (4) 1.6 to 2.8% by weight of beryllium, 0.4 to 1.0% by weight of cobalt, 0.2 to 0.35% by weight of silicon and the balance being copper and inevitable impurities.

Preferably, the contents of beryllium (Be), cobalt (Co), nickel (Ni) and silicon (Si) selectively incorporated in the copper alloy lie in the following respective ranges:

Beryllium—0.2 to 2.8% by weight
Cobalt—0.2 to 2.7% by weight
Nickel—1.4 to 2.2% by weight
Silicon—0.2 to 0.35% by weight Set out below are reasons for inclusion of the above elements and a discussion of the upper and lower limits thereof.

Beryllium: 0.2–2.8% by weight

Beryllium is used to (1) protect the structure, when immersed in seawater, against contamination by liberating beryllium ions, (2) improve strength and other properties, e.g., corrosion resistance, of the copper alloy, (3) enhance the productivity of the copper alloy as by heat treatment and grain size regulation, and (4) improve the processability and castability of the copper alloy. At below 0.2% by weight of Be, the above-described effects (1)–(4) are unachievable. At higher than 2.8% by weight, not only is there some metalleability drop but a cost-effective problem arises as well.

Cobalt: 0.2 to 2.7% by weight

Cobalt is used to form a fine CoBe compound and disperse it throughout the alloy matrix, thereby improving the mechanical properties and productivity of the copper alloy. At less than 0.2% by weight this effect is not well achievable. At higher than 2.7% by weight, not only is there some material flowability drop, but there is little or no improvement in the above-described effect as well. In addition, a cost-effective problem arises.

Nickel: 1.4–2.2% by weight

Nickel is used to form a fine NiBe compound and disperse it throughout the alloy matrix, thereby improving the mechanical properties and productivity of the copper alloy. At less than 1.4% by weight this effect is not well achievable. At higher than 2.2% by weight, not only is there some material flowability drop but there is little or no improvement in the above-described effect as well. In addition, a cost-effective problem arises.

Silicon: 0.2–0.35% by weight

Silicon is used to improve the material flowability of the copper alloy. At less than 0.2% by weight this effect is not well achievable. At higher than 0.35% by weight the resulting alloy becomes brittle with a toughness drop.

As a result of years of experimentation and research, it has turned out that the beryllium-copper alloy has a combined effect both on preventing contamination and on the continued liberation of copper ions. Detailed explanation will now be made to the antifouling effect and the continued action of liberating copper ions.

(1) Antifouling Effect

Figure 3:
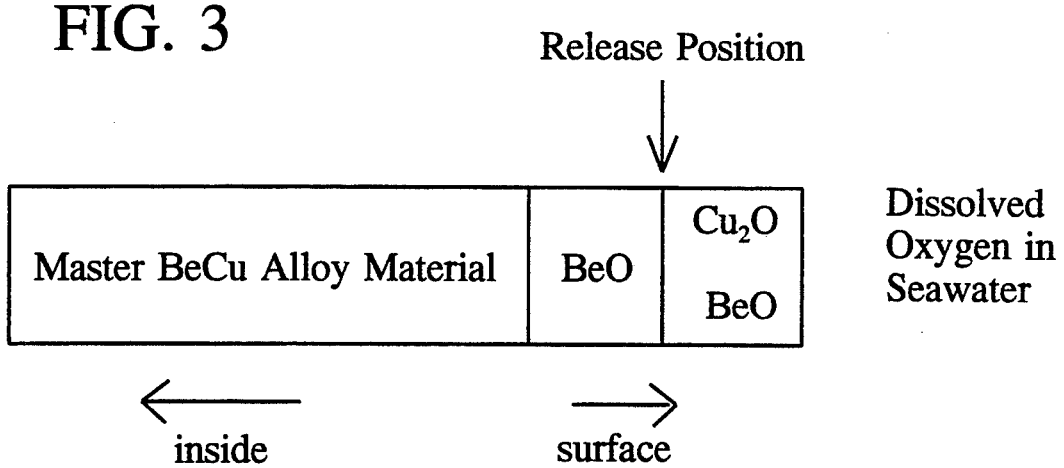
FIG. 3 is a schematic representation of the state of an oxide film of the beryllium-copper alloy according to the invention.

As well known from literature, the order of ionization tendency among beryllium, copper and nickel is expressed by Be>Ni>Cu In other words, beryllium ions are more likely to be liberated than copper ions, and copper ions are more likely to be liberated than nickel ions. In the case of a beryllium-copper combination, beryllium is first ionized to form a local cell, which has an effect on preventing deposition of oceanic life contaminants due to its current effect, while beryllium ions take on the form of internal oxidation. By this internal oxidation, a BeO film is first formed, as typically shown in FIG. 3. This BeO film, because of its porous nature, allows copper ions to be liberated, forming $Cu_2O + BeO$ on the surface. This liberation of copper ions into seawater produces an antifouling effect.

(2) Continued Action on Liberating Copper Ions

The above-mentioned effect (1) of preventing contamination makes another contribution to provide a continued liberation of copper ions. That is, the beryllium-copper combination enables the antifouling function to be maintained ceaselessly. While in contact with seawater, the beryllium-copper combination forms on its surface an intimate surface oxide ($Cu_2O$), and just below that surface oxide, a porous oxide film of BeO is formed, as can be seen from FIG. 3. Thus, the liberation of copper ions into seawater is maintained, while this film increases in volume by the oxidation. When the volume increase reaches a certain level, the surface oxide film peels away from the porous oxide or BeO layer. This would enable electrochemical action and the liberation of copper ions to be maintained over an extended period of time.

The continued action of the beryllium copper on the liberation of copper ions will now be explained with reference to FIG. 5, which is a graphic representation showing the results of comparison of beryllium copper with cupronickel.

Figure 5:
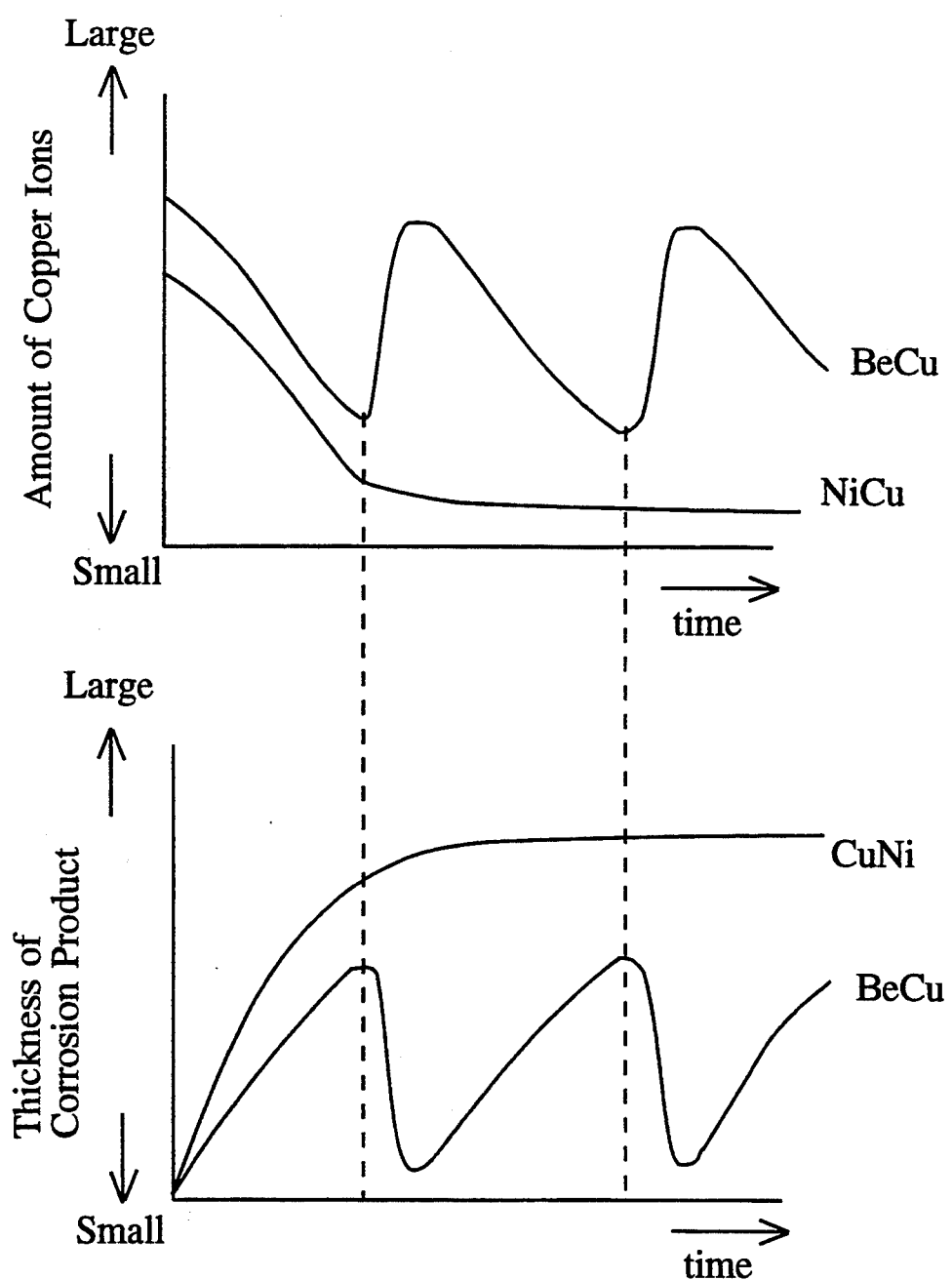
FIG. 5 is a partly cut-away, perspective view showing the first embodiment of the second aspect of the invention.

When the corrosion (oxidation) product reaches a certain thickness, it peels away from the beryllium copper (BeCu), as can be best seen from FIG. 5. Then, the beryllium-copper alloy is again exposed on the surface to seawater, and corroded or oxidized for oxide film growth. When this film grows to a certain thickness level, it peels away from the beryllium copper. This process is repeated over and over. The liberation of copper ions, on the other hand, is likely to be reduced with an increase in the thickness of the oxidation product. As the oxidation product peels away, however, the beryllium-copper alloy is again exposed on the surface to seawater, so that there can be an increase in the amount of the copper ions liberated. Thus, the increase and decrease in the amount of the copper ions liberated occur alternately.

The beryllium-copper alloy used in the invention enables copper ions to be continuously liberated by the peeling-off of the oxide film. As a result, the amount of contaminants deposited onto the surface of the beryllium copper is little, if any.

Figure 4:
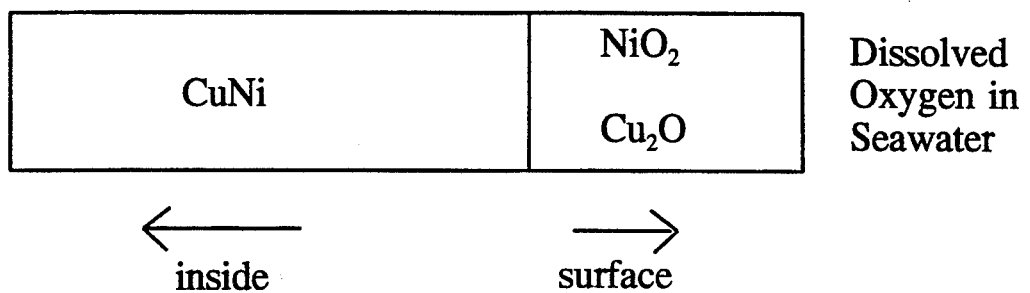
FIG. 4 is a schematic representation of the state of an oxide film of a cupronickel, provided for comparative purposes.

This is in contrast to the comparative cupronickel (CuNi), as can be seen from FIG. 4. With the passing of some years, an intimate nickel oxide ($NiO_2$) or copper oxide ($CuO_2$) layer is formed on the surface of the cupronickel, reducing the liberation of copper ions, as can be seen from FIG. 5. According to the order of ionization tendency (Be>Ni>Cu), the above oxide surface layer appears to be formed due to the fact the nickel (Ni) is preferentially ionized to form a local cell and so an intimate oxide is formed on the surface of the cupronickel, as can be seen from FIG. 5. As can be seen from FIG. 6, the thickness of the corrosion product on the cupronickel increases with time in an early stage, but its growth rate decreases as time goes by. With this, there is a decrease in the amount of the copper ions liberated. In addition, the corrosion product is less likely to peel away from the cupronickel that from the beryllium copper. Thus, the quantity of the copper ions liberated remains low, making the antifouling effect low.

It is to be noted that the facts that a beryllium-copper alloy has a remarkable antifouling effect and provides a continued liberation of copper ions have been discovered by us for the first time. Insofar as we are aware, such facts have been disclosed in literature.

It has also been confirmed that not only does a beryllium alloy pose no toxicity problem at all, but its service life in seawater is as long as that of aluminum bronze or white copper.

For practical beryllium alloys, various alloys inclusive of JIS 11 ALLOY having a beryllium content of 0.2 to 0.6% by weight and JIS 25 ALLOY having a beryllium content of 1.8 to 2.0% by weight are now available in the art. In view of the antifouling effect, however a beryllium content of at least 1.60% by weight is preferable. At a beryllium content higher than 2.8% by weight, beryllium no longer forms a solid solution with copper. In other words, the resulting alloy excels in the antifouling effect but undergoes a gradual decrease in metalleability.

Referring now to FIG. 1, there is shown the first embodiment of the invention.

This embodies the application of the invention to a seawater-circulation pipe used in a power plant cooling system.

As disclosed in FIG. 1, a resin layer 2 made up of an electrical insulating material is formed on the inner peripheral wall of a cylindrical iron pipe 1 buried in the ground. Then, a metal gauze 5 comprising a beryllium-copper alloy is applied on the surface of the resin layer 2.

The metal gauze 5 of beryllium copper, that is precontracted in a cylindrical form, is extended out on the ground, and then inserted through the underground iron pipe 1, wherein it is spread over the surface of the resin layer 2. It is here noted that the resin layer 2 is pre-coated thereon with an adhesive agent. After this, the metal gauze 5 is drawn out in the direction shown by an arrow in FIG. 1.

Figure 2:
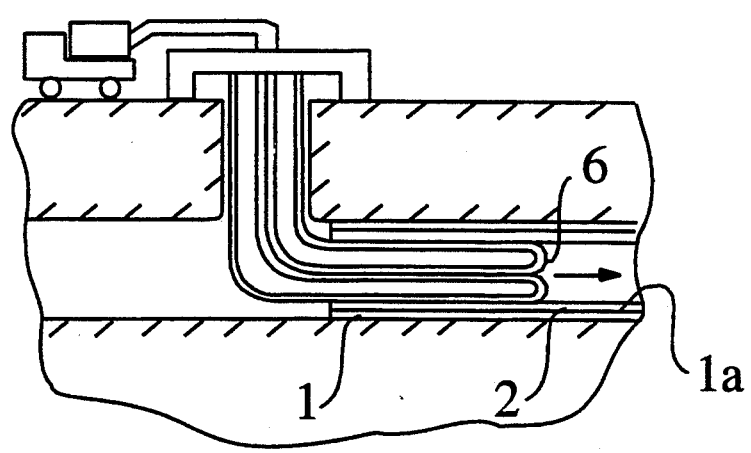
FIG. 2 is a schematic view showing the second embodiment of the lining method according to the invention.

Illustrated in FIG. 2 is the second embodiment of the invention.

This embodies the bonding of a metal gauze 6 made up of a beryllium-copper alloy to the inner wall of a pipe member 1 by the roll-over technique.

Water is supplied into the pipe member 1 by way of a water-supply vehicle, so that the metal gauze 6 can be gradually inserted through the pipe 1 by the resulting water pressure with the inner side turned outwards.

In the instant embodiment, a resin layer 2 is formed on the inner wall surface 1a of the pipe 1. After the drying of the resin layer 2, the metal gauze 6 is bonded thereto. To this end, preference is given to coating the inner wall of the pipe 1 with, e.g., an adhesive agent.

The second embodiment of the invention enables the metal gauze 6 to be well bonded to the inner wall of the pipe. As is the case with the first embodiment of the invention, the organism deposit-inhibition structure including the metal gauze 6 is well resistant to a seawater attack, giving rise to an antifouling effect.

The third embodiment of the invention will now be explained with reference to FIG. 6.

This embodies the application of the invention to a seawater-circulation pipe used in a power plant cooling system.

Figure 6:
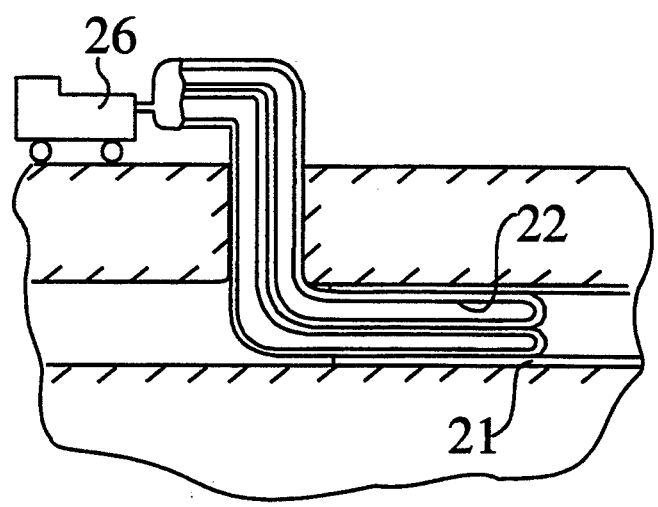
FIG. 6 is a schematic view of the third embodiment of the lining method according to the invention.

As disclosed in FIG. 6, a thermosetting resin layer 22 made up of an electrical insulating material is formed on the inner wall periphery of a cylindrical iron pipe 21 buried in the ground. The electrical insulating resin layer 22 is provided to prevent electrolytic corrosion.

The resin layer 22 is formed by the roll-over technique. To be more specific, water is supplied into the liner (resin layer) 22 impregnated with thermosetting resin by way of a water-supply vehicle 26, so that the liner 22 can be gradually inserted through the iron pipe 21 by the resulting water pressure with the outer side turned inwards. Then, a hot water pipe is connected with the trailing end of the liner 22 to supply hot water into the liner 22, so that the resin forming the liner 22 can be heated and set into a completely set, firm pipe member. After the liner 22 is completely solidified, the warm water in the liner 22 is cooled and drained out by means of a pump, not shown. Following the drainage, the hot water hose is removed to give a clear finish to the section of the liner 22.

Figure 7:
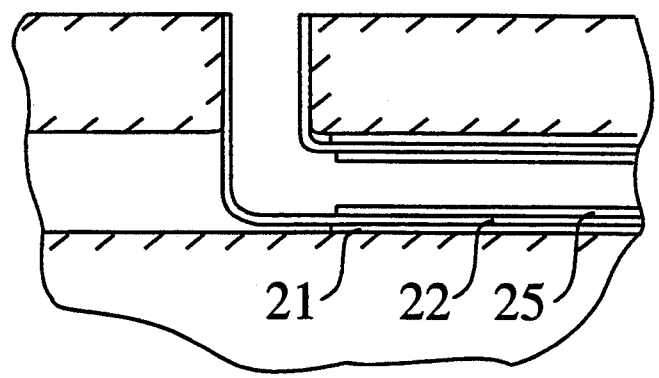
FIG. 7 is a schematic view showing the pipe member lined with the organism deposit-inhibition structure according to the third embodiment of the invention.

Then, a beryllium-copper alloy layer 25 is formed on the inner wall surface of the liner 22, as disclosed in FIG. 7. The beryllium-copper alloy layer 25, for instance, may be applied to the inner wall surface of the liner 22 in the form of a rectangular or spiral thin sheet form, or may alternatively be applied thereto as by thermal spraying. However, it is to be understood that the beryllium-copper alloy layer 25 may otherwise be formed.

The third embodiment of the invention enables the resin layer 22 to be well bonded to the inner wall of the pipe. As is the case with the first embodiment of the invention, the organism deposit-inhibition structure according to the third embodiment is well resistant to a seawater attack, giving rise to considerable antifouling effect.

With the lining methods according to the invention, the metal gauze made up of a copper alloy can be applied to an application surface in a relatively simple manner. The organism deposit-inhibition structure lined according to this method excels in corrosion resistance, can be maintained in less troublesome operation, and can effectively inhibit deposition of marine organisms without offering any toxicity problem. The copper alloy bonded to an application surface by these lining methods, as already mentioned, has remarkable effects to inhibit marine organisms from having access to portions of offshore or marine structures, and is equivalent in durability to aluminum bronze or white copper.

I claim:

1. A method of preventing organism deposition on a surface of an object in contact with sea water, comprising the steps of:
   forming an insulator layer on said surface; and
   bonding a metal gauze comprised of a beryllium-copper alloy to the insulator layer, whereby copper ions are continuously liberated and deposition of marine organisms on said surface is prevented.

2. The method of claim 1, wherein the beryllium content is 0.2 to 2.8% by weight.

3. The method of claim 1, wherein said beryllium-copper alloy is selected from the group consisting of Be—Cu, Be—Co—Cu, Be—Co—Si—Cu and Be—Ni—Cu alloys.

4. The method of claim 1, wherein the insulator layer comprises resin.

5. A method of preventing organism deposition in a metal pipe member, comprising the steps of:
   forming an insulator layer on an inner wall surface of a metal piper member; and
   bonding a metal gauze comprised of beryllium-copper alloy to the insulator layer.

6. The method of claim 5, wherein the beryllium content is 0.2 to 2.8% by weight.

7. The method of claim 5, wherein said beryllium-copper alloy is selected from the group consisting of Be—Cu, Be—Co—Cu, Be—Co—Si—Cu and Be—Ni—Cu alloys.

8. The method of claim 5, wherein the insulator layer comprises resin.

9. The method of claim 5, wherein the metal gauze is bonded to the insulator layer by a roll-over technique, the metal gauze being turned inside-out and applied against said insulator layer.

10. The method of claim 5, wherein the insulator layer is formed on said inner wall surface of said metal pipe member by a roll-over technique, the insulator layer being turned inside-out and applied against said inner wall surface.

* * * * *